(12) United States Patent
Kinoshita et al.

(10) Patent No.: US 7,648,618 B2
(45) Date of Patent: Jan. 19, 2010

(54) METHOD FOR REFINING INORGANIC SHORT FIBER

(75) Inventors: Kyoichi Kinoshita, Kariya (JP); Motoharu Tanizawa, Kariya (JP)

(73) Assignee: Kabushiki Kaisha Toyota Jidoshokki, Aichi-ken (JP)

( * ) Notice: Subject to any disclaimer, the term of this patent is extended or adjusted under 35 U.S.C. 154(b) by 316 days.

(21) Appl. No.: 10/438,508

(22) Filed: May 15, 2003

(65) Prior Publication Data

US 2003/0234174 A1 Dec. 25, 2003

(30) Foreign Application Priority Data

May 17, 2002 (JP) ............... 2002-143209

(51) Int. Cl.
*B82B 3/00* (2006.01)
(52) U.S. Cl. .............. 204/553; 423/461; 209/509; 977/845
(58) Field of Classification Search ............ 977/DIG. 1, 977/845; 423/461; 209/509; 204/553
See application file for complete search history.

(56) References Cited

U.S. PATENT DOCUMENTS 4,663,230 A 5/1987 Tennent ............... 428/367
4,938,844 A 7/1990 Ito et al. ............... 162/102

FOREIGN PATENT DOCUMENTS

| JP | 6-228824 | | 8/1994 | |
|----|----------|---|--------|---|
| JP | 7-48111 | | 2/1995 | |
| JP | 8-198611 | | 8/1996 | |
| JP | 8-231210 | | 9/1996 | |
| JP | 2000-72422 | * | 3/2000 | ............... 31/2 |

OTHER PUBLICATIONS

Tobji et al., 'Purifying Single-walled nanotubed' in *Nature* blume 383 p. 679 Oct. 24, 1996.*
IB07 Techical Disclosure Bulletin NA930655 'Separation of Fulbrenes by Electrophoresis'. Jun. 1, 1993.*

* cited by examiner

*Primary Examiner*—Stuart Hendrickson
(74) *Attorney, Agent, or Firm*—Locke Lord Bissell & Liddell LLP

(57) ABSTRACT

A method for refining inorganic short fibers at a high yield rate. In the refining method of inorganic short fibers according to the present invention, an electric field is applied to dielectric liquid in which inorganic short fibers that include impurities are dispersed. The inorganic short fibers to which the electric field is applied are polarized and bonded with each other. The inorganic short fibers in the dielectric liquid are caused to fall. The falling inorganic short fibers are collected separately from the falling impurities utilizing the difference between the falling rate of the bonded inorganic fibers and the falling rate of the impurities.

5 Claims, 1 Drawing Sheet

US 7,648,618 B2

METHOD FOR REFINING INORGANIC SHORT FIBER

BACKGROUND OF THE INVENTION

The present invention relates to a method for refining inorganic short fibers such as carbon nanotubes (CNTs).

The CNTs generated by an arc discharge method and a laser evaporation method generally include impurities, which are not CNT. For example, such CNTs include carbonaceous matter, such as graphites and fullerenes. In a case where metal catalysts are used to generate the CNTs, the CNTs further include the metal catalysts as impurities.

Japanese Laid-Open Patent Publication No. 8-198611 discloses a method for removing impurities included in CNTs. In the method of the publication, a mixture of CNTs and impurities goes through a centrifugal separation or a floatation to remove carbonaceous matter other than the CNTs. If CNTs include metal catalysts, acid is added in the mixture of the CNTs and the impurities to dissolve and remove the metal catalysts. Alternatively, the mixture of CNTs and impurities is passed through a magnetic field. However, in the above mentioned methods, CNTs and impurities are not reliably separated. Therefore, CNTs are not refined with a high yield rate.

SUMMARY OF THE INVENTION

Accordingly, it is an objective of the present invention to provide a method for refining inorganic short fibers at a high yield rate.

To achieve the above objective, the present invention provides a method for refining inorganic short fibers. The method includes: dispersing inorganic short fibers that include impurities into dielectric liquid; applying an electric field to the dielectric liquid, wherein the inorganic short fibers are polarized and aligned in an electric field direction, and wherein the polarized inorganic short fibers are bonded with one another; causing the inorganic short fibers and the impurities to fall in the dielectric liquid, wherein the falling rate of the bonded inorganic short fibers is different from the falling rate of the impurities; and collecting the falling inorganic short fibers separately from the falling impurities utilizing the difference between the falling rate of the inorganic short fibers and the falling rate of the impurities.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawing in which.

DETAILED DESCRIPTION OF THE PREFERRED EMBODIMENTS

Figure 1:
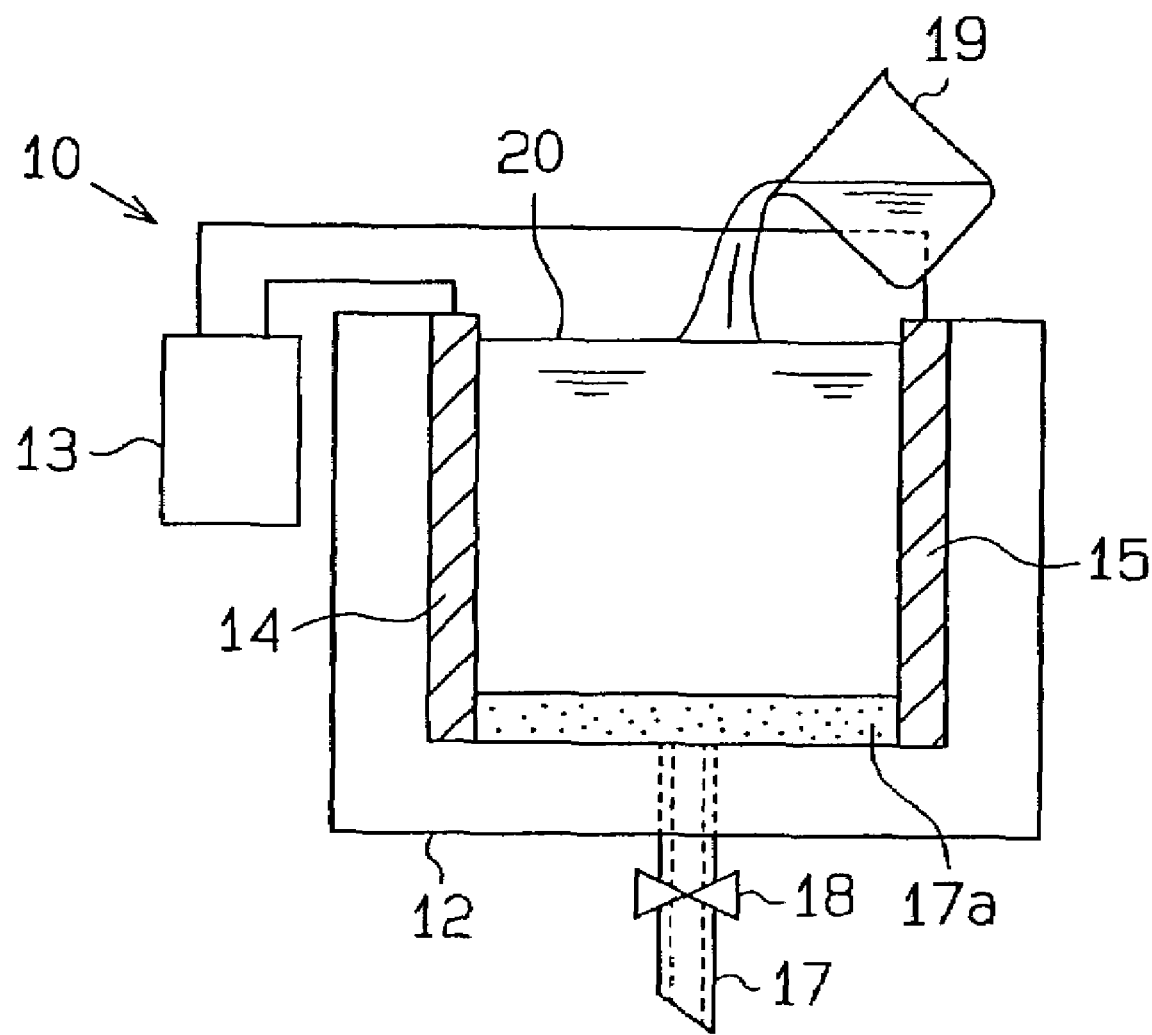
FIG. 1 is a schematic view illustrating an electrostatic orientation apparatus used for refining inorganic short fibers according to a preferred embodiment.

A preferred embodiment of the present invention will now be described with reference to FIG. 1.

In a method for refining inorganic short fibers according to the preferred embodiment, an electrostatic orientation apparatus 10 shown in FIG. 1 is used. The electrostatic orientation apparatus 10 includes a container 12. The container 12 has a pair of inner side surfaces, which face each other. First and second electrodes 14 and 15 are each attached to one of the inner side surfaces and are connected to a voltage applying apparatus 13. The voltage applying apparatus 13 applies an alternating high voltage to the first and second electrodes 14, 15.

A drain pipe 17 is located at the bottom of the container 12. A faucet 18 is attached to the drain pipe 17. A filter 17a is attached to the inner bottom surface of the container 12 and covers the upper opening of the drain pipe 17.

The container 12 stores dielectric liquid 20. The dielectric liquid 20 is liquid that is polarized when an electric field is applied. Concrete examples of the dielectric liquid 20 include silicone oil, halogenated hydrocarbon, such as carbon tetrachloride, n-hexane, and cyclohexane. The silicone oil is preferably used after reducing the viscosity.

A method for refining inorganic short fibers according to the preferred embodiment will now be described. An example of a method for refining inorganic short fibers, which is CNTs in the preferred embodiment, is discussed below. The CNTs to be refined may be either single-wall carbon nanotubes or multi-wall carbon nanotubes.

The dielectric liquid 20 is filled in the container 12 of the electrostatic orientation apparatus 10 in advance. Unrefined CNTs are added to and dispersed in another dielectric liquid 20 separate from the dielectric liquid 20 that is in the container 12. The unrefined CNT is generated by, for example, an arc discharge method and includes first and second impurities. In this embodiment, the first impurities are metal catalysts, and the second impurities are nonfibrous carbons, such as graphites and fullerenes. The dielectric liquid 20 preferably includes an appropriate amount of surface active agent. The surface active agent causes the CNTs to be reliably dispersed in the dielectric liquid 20. A preferable surface active agent is a nonionic surface active agent.

The voltage applying apparatus 13 applies an alternating high voltage to the first and second electrodes 14, 15. In this state, the dielectric liquid 20 in which the unrefined CNTs are dispersed is supplied to the container 12 using a supplying container 19. The supplied dielectric liquid 20 is then mixed with the dielectric liquid 20 in the container 12. As a result, an electric field formed between the first electrode 14 and the second electrode 15 is applied to the dielectric liquid 20 and the CNTs. The electric field applied to the dielectric liquid 20 and the CNTs preferably has an intensity of 1 to 15 kV/cm. The unrefined CNT content of the dielectric liquid 20 in the container 12 is preferably approximately 500 mg per 100 ml of the dielectric liquid 20.

When the electric field is applied to the CNTs in the dielectric liquid 20, one end of each CNT is oriented toward the first electrode 14 and the other end of the CNT is oriented toward the second electrode 15. In other wards, the CNTs in the dielectric liquid 20 to which an electric field is applied are aligned along the electric field direction. The CNTs in the dielectric liquid 20 are also polarized when the electric field is applied. Each end of the polarized CNT is electrically combined with one of the ends of another polarized CNT. In other words, the polarized CNTs are bonded with each other.

When the dielectric liquid 20 that includes the unrefined CNTs is left at rest while the electric field is applied, the unrefined CNTs start to precipitate. The dimension of the bonded CNTs is greater than the dimension of the nonfibrous carbon. Therefore, the falling rate (sedimentation rate) of the bonded CNTs is greater than the falling rate of the nonfibrous carbon. The gravity of the metal catalysts is greater than the gravity of the CNTs and the nonfibrous carbons. Therefore, the falling rate of the metal catalysts is greater than the falling rate of the bonded CNTs and the nonfibrous carbon. Thus, sediment includes a layer of the metal catalysts, a layer of the CNTs, which is formed above the metal catalysts layer, and a layer of the nonfibrous carbon, which is formed above the CNTs layer.

The faucet 18 is opened after sediment is sufficiently stored at the bottom of the container 12. Accordingly, the dielectric liquid 20 in the container 12 is drained through the drain pipe 17. After that, the nonfibrous carbons are removed from the top of the sediment remained in the container 12 and the CNTs are collected subsequently. The CNTs are refined as described above.

The preferred embodiment provides the following advantages.

The falling rate of the bonded CNTs greatly differs from the falling rate of the impurities. Therefore, the CNTs and the impurities are reliably separated by the refining method of the preferred embodiment. Accordingly, the CNTs are refined at a high yield rate.

After the dielectric liquid 20 is drained through the drain pipe 17, the precipitated CNTs are collected from the upper part of the sediment. This prevents the impurities from being mixed with the CNTs when collecting the CNTs. The precipitated CNTs can also be drained through the drain pipe 17 with the dielectric liquid 20 to be collected. However, in this case, the possibility that the precipitated impurities are mixed with the CNTs increases.

When the electric field applied to the CNTs is formed based on a direct voltage, the electric charge is transferred between the bonded CNTs. As a result, the bond of the CNTs might be dissociated. However, in the refining method of the preferred embodiment, the electric field applied to the CNTs is formed based on the alternating voltage. In this case, the direction of the electric field is reversed before the electric charge is transferred between the bonded CNTs. This prevents the dissociation of the bond of the CNTs.

The dielectric liquid 20 in which the unrefined CNTs is dispersed is supplied to the container 12 at once. Therefore, the CNTs are separated from the impurities without agitating the dielectric liquid 20 in the container 12 and are precipitated out of the dielectric liquid 20. If the dielectric liquid 20 in which the unrefined CNTs are dispersed is supplied to the container 12 sequentially, the CNTs in the dielectric liquid 20 supplied earlier might precipitate at the same time as the metal catalysts in the dielectric liquid 20 supplied afterward. To prevent this, the dielectric liquid 20 in the container 12 needs to be agitated while supplying the dielectric liquid 20 in which the unrefined CNTs are dispersed.

It should be apparent to those skilled in the art that the present invention may be embodied in many other specific forms without departing from the spirit or scope of the invention. Particularly, it should be understood that the invention may be embodied in the following forms.

The intensity of the electric field applied to the dielectric liquid 20 and the CNTs in the container 12 need not be 1 to 15 kV/cm. However, if the intensity of the applied electric field is less than 1 kV/cm, the CNTs can be insufficiently oriented in a desired direction. If the intensity of the applied electric field is greater than 15 kV/cm, the dielectric liquid 20 in the container 12 is agitated, which hinders the CNTs from being oriented in a desired direction.

Amount of the unrefined CNTs added to the dielectric liquid 20 need not be 500 mg per 100 ml of the dielectric liquid 20.

The filter 17a may be omitted. In this case, the faucet 18 is opened when the metal catalysts have precipitated such that the metal catalysts are drained through the drain pipe 17 with the dielectric liquid 20. At the time the metal catalysts have precipitated, the nonfibrous carbons float at the upper portion of the dielectric liquid 20 and the CNTs float at the lower portion of the dielectric liquid 20. Therefore, the CNTs are separated from the nonfibrous carbons by closing the faucet 18 after draining the metal catalysts and collecting the upper portion of the dielectric liquid 20. When the remaining dielectric liquid 20 is left at rest, the CNTs precipitate. When the faucet 18 is opened again, the precipitated CNTs are drained through the drain pipe 17 with the dielectric liquid 20. In this modified embodiment, the CNTs and the impurities are separated before the nonfibrous carbons precipitate. This reduces the time required for refining.

The present invention may be applied to refining of carbon short fibers other than CNTs, such as carbon nanohorn and carbon microcoil. The carbon microcoil generated by a chemical vapor deposition (CVD) method has a high purity as compared to the CNTs generated by the arc discharge method but includes metal catalysts as impurities. The carbon microcoil may either have two adjacent loops connected to each other or the loops separate from each other.

The present invention may be applied to refining of boron nitride nanotube. The present invention may also be applied to refining of nanotube formed of silicon carbide (SiC), silicon oxide ($SiO_2$), aluminum oxide ($Al_2O_3$), vanadium oxide ($V_2O_5$), molybdenum oxide ($MoO_3$), and titanium oxide ($TiO_2$). In the case where the present invention is applied to refining of inorganic short fibers other than the CNTs, the intensity of the electric field applied to the inorganic short fibers and the density of the inorganic short fibers in the dielectric liquid 20 may be changed as required.

The electric field applied to the CNTs need not be formed based on the alternating voltage but may be formed based on the direct voltage. In the case the electric field applied to the CNTs is formed based on the direct voltage, the dissociation of the bond of the CNTs is suppressed by applying conductivity on the surface of the CNTs or by changing the dielectric liquid or the surface active agent.

Therefore, the present examples and embodiments are to be considered as illustrative and not restrictive and the invention is not to be limited to the details given herein, but may be modified within the scope and equivalence of the appended claims.

The invention claimed is:

1. A method for refining carbon nanotubes, the method comprising:

dispersing unrefined carbon nanotubes, which contain impurities including nonfibrous carbons and metal catalysts, into a dielectric liquid containing a surface active agent;

causing carbon nanotubes to precipitate out of the dielectric liquid when the dielectric liquid is left at rest so as to separate the carbon nanotubes from the nonfibrous carbons and metal catalysts based solely on the differences between the rates of sedimentation of the carbon nanotubes, nonfibrous carbons and metal catalysts by applying an electric field having an intensity of 1 to 15 kV/cm to the dielectric liquid to cause the unrefined carbon nanotubes in the dielectric liquid to electrostatically bond end to end with one another in a direction parallel to the direction of the electric field such that the size of the carbon nanotubes bonded together is greater than the size of the nonfibrous carbons in the dielectric liquid and the bonded carbon nanotubes fall through the dielectric liquid at a rate that is faster than the rate at which the nonfibrous carbons fall through the dielectric liquid but slower than the rate at which the metal catalysts fall through the dielectric liquid so as to form a three-layer sediment having a bottom layer of metal catalysts, an intermediate layer of carbon nanotubes formed above the layer of metal catalysts and a top layer of nonfibrous carbons formed above the layers of metal catalysts and carbon nanotubes, wherein the causing carbon nanotubes to precipitate out of the dielectric liquid is performed within a container provided with a drain pipe;

removing, after formation of the three-layer sediment, the dielectric liquid and the layer of nonfibrous carbons, wherein the removing the dielectric liquid is conducted only after the formation of the three-layer sediment by opening a faucet of the drain pipe to drain the dielectric liquid through the drain pipe; and collecting the precipitated carbon nanotubes after the dielectric liquid and the layer of nonfibrous carbons have been removed.

2. The method according to claim 1, wherein the applied electric field is formed based on an alternating voltage.

3. The method according to claim 1, wherein the unrefined carbon nanotubes are dispersed into the dielectric liquid such that approximately 500 mg of the unrefined carbon nanotubes are contained per 100 ml of the dielectric liquid.

4. The method according to claim 1, wherein the surface active agent is a nonionic surface active agent.

5. The method according to claim 1, wherein the causing carbon nanotubes to precipitate out of the dielectric liquid is performed within a container provided with a single drain pipe.

* * * * *